United States Patent [19]

Rekuc

[11] Patent Number: 5,450,661
[45] Date of Patent: Sep. 19, 1995

[54] SWIVEL HOOK ASSEMBLY

[75] Inventor: Richard Rekuc, Pattenburg, N.J.

[73] Assignee: Royalox International, Inc., Phillipsburg, N.J.

[21] Appl. No.: 242,727

[22] Filed: May 13, 1994

[51] Int. Cl.[6] ............................................. A44B 13/00
[52] U.S. Cl. ................................. 24/599.6; 24/598.5; 24/601.1; 24/905
[58] Field of Search ................. 24/599.6, 598.4, 598.5, 24/600.9, 601.1, 601.2, 601.5, 265 H, 573.5, 297, 905; 411/508

[56] References Cited

U.S. PATENT DOCUMENTS

| 194,442 | 8/1877 | Knapp et al. | 24/599.6 |
|---|---|---|---|
| 1,059,812 | 4/1913 | Barry | 24/601.1 |
| 3,009,381 | 11/1961 | Rapata | 411/508 |
| 4,195,872 | 4/1980 | Skaalen et al. | 24/599.6 |
| 4,577,374 | 3/1986 | Lii | 24/265 H |
| 4,868,954 | 9/1989 | Kasai | 24/265 H |
| 5,274,887 | 1/1994 | Fudaki | 24/600.9 |

FOREIGN PATENT DOCUMENTS 0354400  2/1990  European Pat. Off. ........... 24/598.4

Primary Examiner—Victor N. Sakran
Attorney, Agent, or Firm—Herbert Dubno

[57] ABSTRACT

A swivel hook assembly has a head on its pin rotatable in a limb of a loop which is formed with a raised rim outwardly of a collar extending inwardly from the limb into the loop and surrounding the bore receiving the pin to prevent enlargement of the bore and escape of the pin from the bore with separation of the hook from the loop.

5 Claims, 1 Drawing Sheet

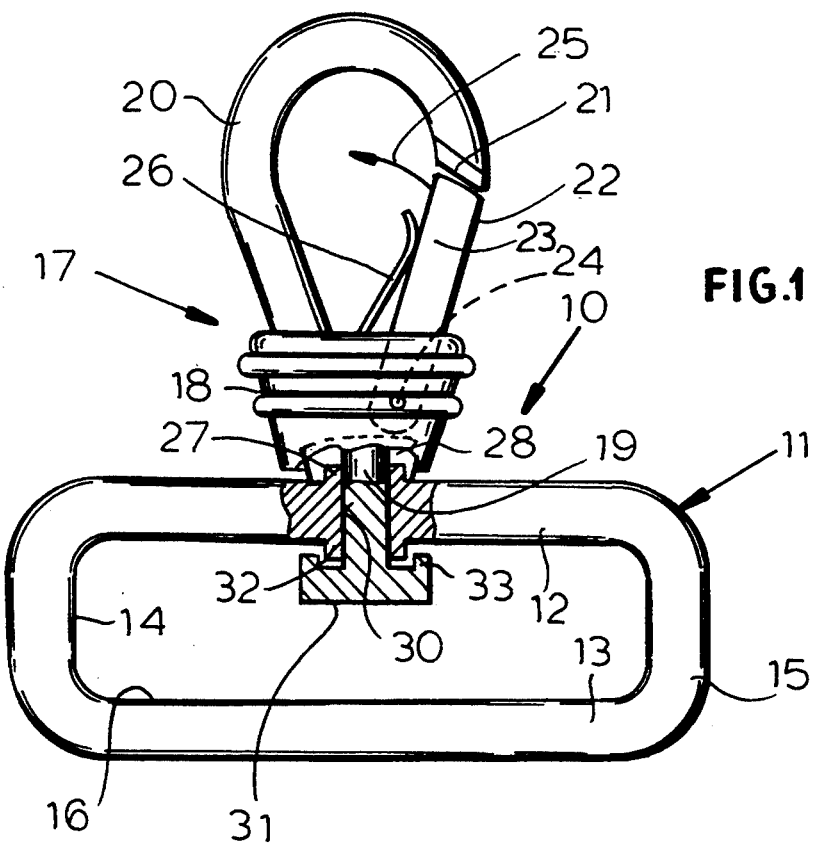
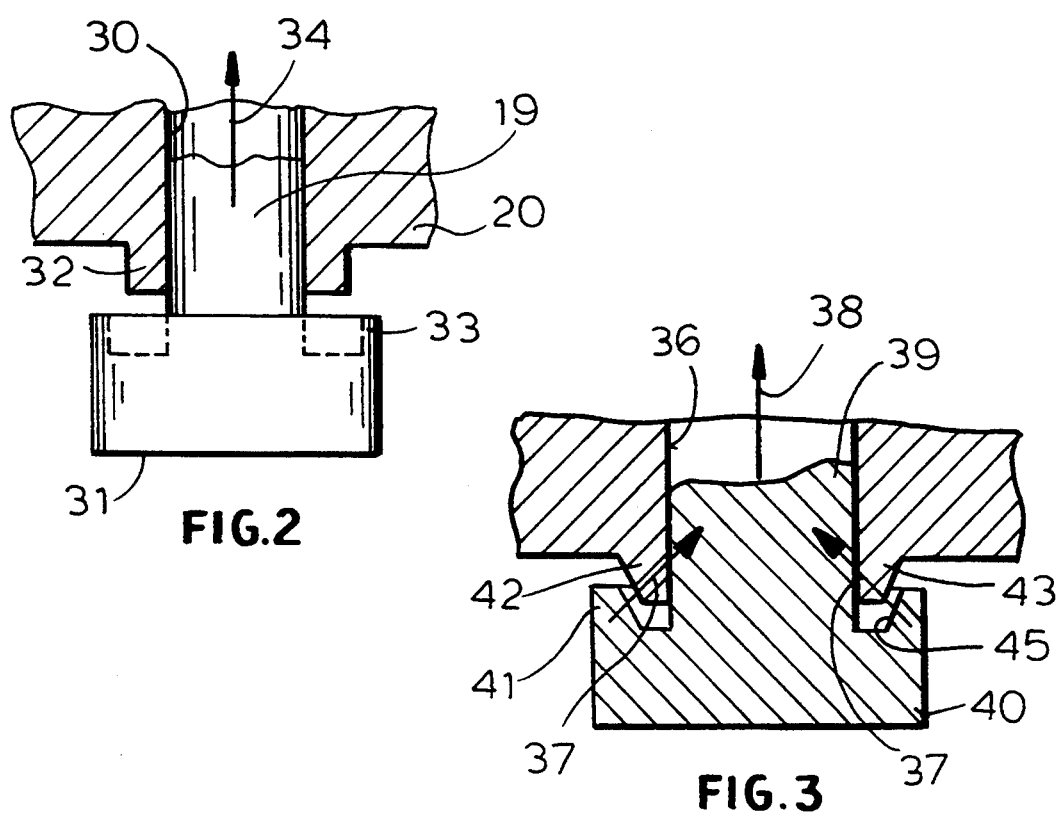

SWIVEL HOOK ASSEMBLY

FIELD OF THE INVENTION

My present invention relates to a swivel hook assembly and, more particularly, to a swivel hook of the type in which the hook member is attached to a loop through which a belt can pass.

BACKGROUND OF THE INVENTION

Swivel hook assemblies are widely used in luggage, e.g. to releasably secure a shoulder strap to an article of luggage.

In a typical construction, the strap is terminated at one end or both ends in a swivel hook which can engage a D-ring or other eye affixed to the article of luggage, the swivel hook having, in addition to the hook member itself, a loop, usually of metal, through which the belt or strap passes and which can be affixed to the belt or strap or stitching or the like.

In the past, various techniques have been utilized to allow the swivel action between the hook and the loop and to connecting the hook to the loop. For example, a pin on the hook can have a head which is inserted through a hole in the loop, the latter being flattened to elongate the hole and thereby prevent withdrawal of the head through the elongated hole which thus results. A problem with this and other constructions has been the tendency of the hole to spread upon the application of force and with wear so that the hook can pull out of the loop.

Other arrangements provide heads on the pin within the loop which can pull off or require complicated multipart constructions to form pockets for the head to trap the head on the loop while allowing a swivel action.

The latter systems are complex, expensive and frequently unsatisfactory for some hook designs while systems which tend to wear and deteriorate in use can not only be inconvenient to the user but can be dangerous in that suddenly released strap ends may swing into the face of the user or others in the vicinity to cause significant injury.

OBJECTS OF THE INVENTION

It is, therefore, the principal object of the present invention to provide an improved swivel hook assembly whereby the aforedescribed drawbacks are obviated.

Another object of the invention is to provide a swivel hook assembly with reduced tendency of the hook to separate from the loop.

SUMMARY OF THE INVENTION

These objects and others which will become apparent hereinafter are attained, in accordance with the present invention, in a swivel hook assembly in which the hook is provided with a pin extending through a hole in a limb of the loop, the pin has a head with a rise along its rim turned toward the body of the hook and around the hole on the interior of the loop, a collar is provided within the rise. Through the cooperation of the raised rim and the collar, the hole is prevented from spreading in that the collar is confined by the rim so that even with prolonged wear, there is little tendency for the pin and its head to pull through the hole.

To further counteract the spreading tendency, the collar can be inwardly beveled or the rim can be beveled, or both, so that, with axial engagement of the head against the collar, forces are directed inwardly against the collar to prevent spreading thereof and hence of the hole surrounded by the collar.

More particularly the swivel hook assembly can comprise:
- a belt loop eye formed with a throughgoing bore and an inwardly projecting collar surrounding the bore; and
- a swivel hook having:
- a swivel hook body,
- a hook fixed on the body and having a free end turned toward and spaced from the body,
- a keeper finger pivotally mounted on the body and swingable inwardly from the free end to allow an eye to be engaged in the hook,
- spring means on the body biasing the finger toward the free end to close the hook,
- a pin on the body swivelably received in the bore and having an end lying inwardly of the bore within the loop, and
- a head on the end of the pin within the loop and formed with a raised rim outwardly of the collar turned toward the body and cooperating with the collar to prevent enlargement of the bore upon use of the assembly sufficient to permit the head to pass through the bore.

The raised rim can be in the form of a cylindrical collar formed on an outer periphery of the head. The head can be cylindrical and the collars likewise cylindrical.

Advantageously the loop has two parallel limbs, one of which is provided with the bore. That limb can have another outwardly projecting collar surrounding the bore and engaging in the body of the hook.

BRIEF DESCRIPTION OF THE DRAWING

The above and other objects, features, and advantages will become more readily apparent from the following description, reference being made to the accompanying drawing in which:

FIG. 1 is an elevational view of a swivel hook assembly accordance to the invention, partly in cross section;

FIG. 2 is a detail view of one arrangement of the raised rim and collar according to the invention; and FIG. 3 is a cross sectional view showing a detail of a second embodiment of the raised rim and collar.

SPECIFIC DESCRIPTION

From FIG. 1 it will be apparent that a swivel hook assembly 10 can comprise a loop member 11 having a pair of parallel limbs 12 and 13 connected at rounded corners by shorter limbs 14 and 15. The loop 11 is generally composed of metal and is formed with an opening 16 through which a belt or strap can pass. The strap can be looped around the limb 13 and held in place by stitching.

The other major part of the swivel hook assembly 10 is a hook 17 itself. That can comprise a body 18 formed with a pin 19 and a fixed hook portion 10 having a free end 21 which is spaced from the body 20 to form a mouth 22 which can be closed by a finger 23.

The finger 23 is pivotally connected at 24 to the body 18 and can swing in the direction of the arrow 25 against a restoring force of a leaf-spring 26 to allow a shackle, eye, D-ring or the like to be inserted into the hook and retained there by the finger 23 with a keeper. When the finger 23 is pressed inwardly, of course, the D-ring or eye can be released. Other spring arrangements can be used to bias the finger or keeper 23 into its closed position.

The pin 19 passes rotatably through a bore 30 in the limb 12 of the loop 11 and is formed with a head 31 of a larger diameter than the bore 30. The head 31 can be coined on the pin 19 or can be a cap or the like welded or otherwise attached thereto.

According to the invention, surrounding the bore 30 on the limb 12, there is a collar 32 which in this embodiment is cylindrical (see FIG. 2) and lies inwardly of a raised rim 33 of the head 31. Thus as the pin is drawn in the direction of arrow 34 against the limb 12, the rim 33 lies outwardly of the collar 32 to prevent widening of the hole 30 even if there should be a tendency of the hook to cant relative to the limb 12. Enlargement of the bore and escape of the head 31 is thereby prevented.

In FIG. 3 I have shown a collar 42 having a beveled flank 43 which cooperates with a beveled flank 45 of a raised rim 41 of the head 40 on the pin 39 of the hook. The beveled flanks convert a pulling force in the direction of arrow 38 into inward force components (arrows 37) to prevent spreading of the bore 36.

The rim 12 may be provided with another collar 27 surrounding the bore 30 but extending outwardly from the limb 12 and received in a recess 28 of the hook body 18.

I claim:

1. A swivel hook assembly, comprising:
   a belt loop eye formed with a throughgoing bore and an inwardly projecting collar surrounding said bore; and
   a swivel hook having:
   a swivel hook body,
   a hook fixed on said body and having a free end turned toward and spaced from said body,
   a keeper finger pivotally mounted on said body and swingable inwardly from said free end to allow an eye to be engaged in said hook,
   spring means on said body biasing said finger toward said free end to close said hook,
   a pin on said body swivelably received in said bore and having an end lying inwardly of said bore within said loop, and
   a head on said end of said pin within said loop and formed with a raised rim outwardly of said collar turned toward said body and cooperating with said collar to prevent enlargement of said bore upon use of said assembly sufficient to permit said head to pass through said bore, said raised rim being in the form of a circumferentially continuous collar having a bevel on an inner flank thereof cooperating with a complementary bevel on an inner flank of said inwardly projecting collar.

2. The assembly defined in claim 1 wherein said raised rim is in the form of a cylindrical collar formed on an outer periphery of said head.

3. The assembly defined in claim 2 wherein said head is cylindrical.

4. The assembly defined in claim 1 wherein said loop is elongated and has two parallel limbs, one of said limbs being formed with said bore.

5. The assembly defined in claim 1 wherein said one of said limbs is formed with an outwardly projecting collar surrounding said bore and engaging in said body.

* * * * *